(12) United States Patent
Tabor

(10) Patent No.: US 6,715,590 B2
(45) Date of Patent: Apr. 6, 2004

(54) BRAKE RELEASE SYSTEM

(75) Inventor: Benjamin Paul Tabor, Dubuque, IA (US)

(73) Assignee: Deere & Company, Moline, IL (US)

( * ) Notice: Subject to any disclaimer, the term of this patent is extended or adjusted under 35 U.S.C. 154(b) by 72 days.

(21) Appl. No.: 10/080,326

(22) Filed: Feb. 21, 2002

(65) Prior Publication Data

US 2003/0155807 A1 Aug. 21, 2003

(51) Int. Cl.[7] .............................................. B60T 13/74
(52) U.S. Cl. ........................ 188/170; 303/15; 303/3
(58) Field of Search ............................ 188/170; 303/3, 303/11, 15, 71

(56) References Cited

U.S. PATENT DOCUMENTS

| | | | | |
|---|---|---|---|---|
| 3,759,545 A | * | 9/1973 | McKethan | 280/423.1 |
| 3,854,559 A | | 12/1974 | Talak et al. | 192/4 A |
| 4,119,355 A | | 10/1978 | Kreitner | 303/85 |
| 4,195,716 A | * | 4/1980 | Wirt | 477/199 |
| 4,307,917 A | * | 12/1981 | Hasselbacher et al. | 303/71 |
| 4,722,575 A | | 2/1988 | Graham | 303/2 |
| 4,749,236 A | | 6/1988 | Graham | 303/2 |
| 4,813,518 A | * | 3/1989 | Akiyama et al. | 188/170 |
| 4,856,622 A | * | 8/1989 | Sartain et al. | 188/170 |
| 5,048,655 A | | 9/1991 | Seeba | 192/0.075 |
| 5,203,616 A | * | 4/1993 | Johnson | 303/10 |
| 5,895,099 A | * | 4/1999 | Diecke et al. | 303/9.61 |
| 5,984,425 A | * | 11/1999 | Orzal | 303/3 |
| 6,168,244 B1 | * | 1/2001 | Maske | 303/3 |
| 6,170,922 B1 | * | 1/2001 | Vannorsdel et al. | 303/71 |

OTHER PUBLICATIONS

Hydraulic Schematic From a LIEBHERR Service Manual; one print.

* cited by examiner

Primary Examiner—Robert A. Siconolfi

(57) ABSTRACT

A work vehicle having spring applied hydraulically released brakes is provided with a secondary hydraulic system having a manually operated pump that directs fluid to a cylinder through a secondary system hydraulic line. The secondary system hydraulic line has first and second quick couplers that are coupled to one another to direct fluid to the cylinder. A brake system hydraulic line is hydraulically positioned between the brakes and a source of pressurized fluid. An electrically actuated brake valve is hydraulically positioned between the source of pressurized fluid and the brakes, along the brake system hydraulic line, for selectively directing pressurized fluid to the brakes. The brake system hydraulic line is further provided with a third quick coupler that is coupled to the first coupler to direct pressurized fluid from the manually operated pump to the brakes to release the brakes, when towing the vehicle.

20 Claims, 3 Drawing Sheets

BRAKE RELEASE SYSTEM

FIELD OF THE INVENTION

The present invention is directed to a brake release system for a work vehicle having spring applied hydraulically released brakes.

BACKGROUND OF THE INVENTION

Many large work vehicles are provided with spring applied hydraulically released brakes. These brakes are constantly applied by springs. The brakes are released by directing pressurized hydraulic fluid to the brakes to compress the springs. Typically these brakes cannot be released unless the engine is running and the source of pressurized hydraulic fluid, a pump, is directing pressurized hydraulic fluid to the brakes. Sometimes the engines or the hydraulic pumps on these machines break down in remote locations where they are inconvenient to repair. This is especially true in forest fire applications where moving the vehicle is time critical. However, as the brakes are in the applied mode it makes towing the vehicle difficult if not impossible. Therefore another source of pressurized hydraulic fluid needs to be applied to the brakes before towing the vehicle. Vehicle mounted manually operated hydraulic pumps have been proposed to supply a source of pressurized hydraulic fluid. In addition electrically actuated brake valves are also known.

SUMMARY OF THE INVENTION

It is an object of the present invention to provide a brake release system for spring applied hydraulically released brakes from a secondary hydraulic system.

A work vehicle is provided with a dual path hydrostatic transmission and spring applied hydraulically released brakes. The dual path hydrostatic transmission comprises left and right variable displacement pumps supplying pressurized hydraulic fluid to left and right hydraulic motors. Charge pumps for the variable displacement pumps provides a source of pressurized hydraulic fluid through a brake system hydraulic line to the spring applied hydraulically released brakes. This pressurized hydraulic fluid is selectively applied to the brakes by an electrically actuated two-position solenoid brake valve.

A controller controls the hydraulic output of the variable displacement pumps and the activation of the brakes through the brake valve. The controller receives operator inputs from an ignition switch, a brake pedal and a steering input element. The brake pedal sequentially moves through a first arc segment and then a second arc segment. As the brake pedal is moved through the first arc segment the hydraulic outputs of the variable displacement pumps are reduced and the vehicle is decelerated. As the brake pedal moves into the second arc segment the spring applied hydraulically released brakes are applied.

The vehicle is provided with a secondary hydraulic system for tilting the operator's station for access to maintain various assemblies on the vehicle. The secondary hydraulic system, comprises a manually operated hydraulic pump and a hydraulic cylinder for tilting the operator's station. A secondary system hydraulic line extends between the manually operated hydraulic pumps and the hydraulic cylinder. The secondary system hydraulic line is provided with a first hydraulic quick coupling and a second hydraulic quick coupling. These quick couplings are coupled to one another to form a flow path to direct pressurized hydraulic fluid from the manually operated pump to the hydraulic cylinder. When the vehicle needs to be towed the first quick coupling is decoupled from the second quick coupling and coupled to a third hydraulic quick coupling located on the brake system hydraulic line. A key is placed in the ignition to signal the controller to shift the electrically actuated brake valve, and the manually operated hydraulic pump is pumped directing pressurized hydraulic fluid from the secondary hydraulic system through the first and third hydraulic quick couplings to the spring applied hydraulically released brakes. The hydrostatic transmission is also short circuited to allow the ground engaging means to freewheel.

DETAILED DESCRIPTION

Figure 1:
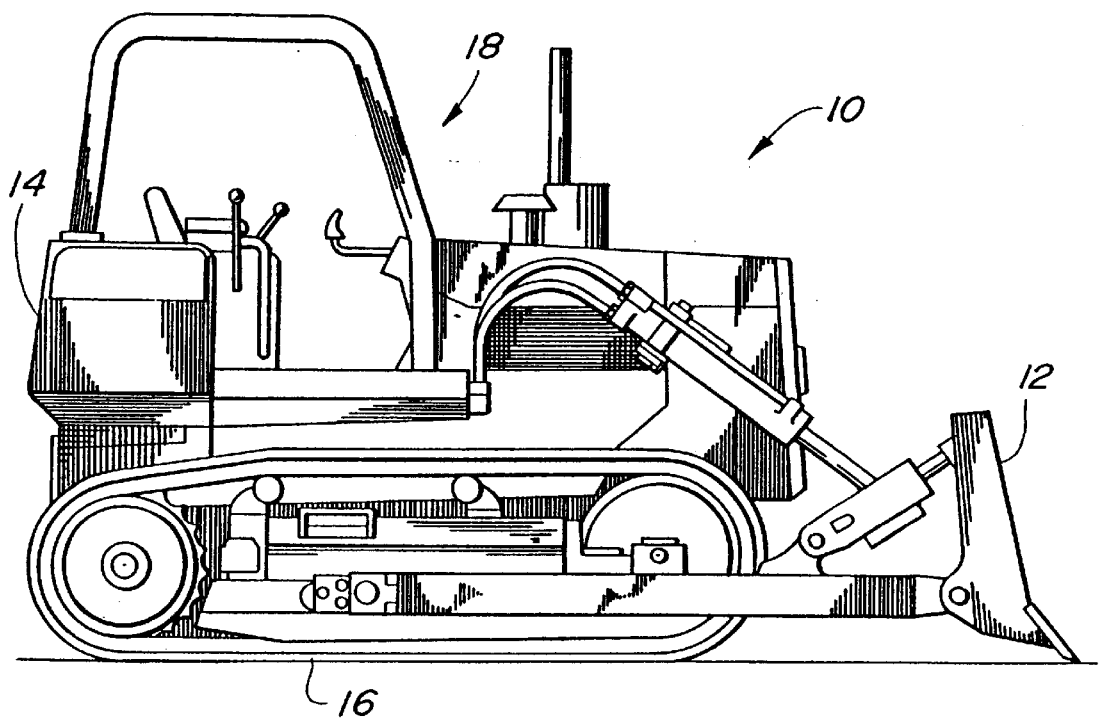
FIG. 1 is a side view of a work vehicle.

A work vehicle in the illustrated form of a bull dozer 10 is used to perform a work operation. That is bulldozing dirt with blade 12. The work vehicle 10 comprises a frame 14 having ground engaging means 16 for supporting and propelling the vehicle. Although the illustrated embodiment shows a tracked vehicle, the present invention could also be used with work vehicles having wheels as their ground engaging means. The positioning of the blade 12 relative to the frame 14 is controlled from the operator's station 18. In addition, the operation of the ground engaging means 16 is also controlled from the operator's station 18.

The tracks are driven by a dual path hydrostatic transmission having left and right variable displacement pumps 20 and 21 and left and right hydraulic motors 22 and 23. The hydrostatic pump cases are charged by charge pumps 24 that form a source of pressurized hydraulic fluid. The charge pumps 24 and the hydrostatic pumps 20 and 21 are driven by an internal combustion engine, not shown. The charge pumps 24 direct pressurized hydraulic fluid through a hydrostatic filter 26. A filter bypass valve 28 provides an alternative route for the pressurized hydraulic fluid if the filter 26 becomes clogged. Constant pressure on the case drains of the hydrostatic pump cases is maintained by pressure relief valve 30.

A branch hydraulic line 32 directs the pressurized hydraulic fluid from the charge pumps 24 past a check valve 34 to the brake system hydraulic line 36. The left and right brakes 38 and 39 are spring applied hydraulically released brakes, wherein pressurized hydraulic fluid is required to release the brakes by overcoming the springs. Constant pressure is directed to the brakes 38 and 39 by pressure relief valve 40. Excess hydraulic fluid is returned to reservoir 42 by valve 40. The hydraulic fluid pressure in the brake system hydraulic line 36 is monitored by pressure gauge 44.

A two-position three-way solenoid valve 46 is hydraulically positioned between the brakes 38 and 39 and the source of pressurized fluid. When the brakes 38 and 39 are to be released, solenoid 48 is energized overcoming valve biasing spring 50 shifting the valve 46 and directing the pressurized hydraulic fluid to the brakes 38 and 39. The pressurized hydraulic fluid overcomes the brake springs and the brakes 38 and 39 are released as long as pressurized hydraulic fluid is supplied to the brakes 38 and 39. To apply the brakes the solenoid 48 is de-energized so that the biasing spring 50 shifts the valve 46 and hydraulically connects the brakes 38 and 39 to the reservoir 42 allowing the brake springs to reapply the brakes 46. Clearly, if the engine is shut down or hydraulic pressure is lost, the brakes 46 will automatically be applied because of the loss of pressurized hydraulic fluid.

The operation of the brakes 46 and the hydrostatic transmission are controlled by a transmission controller 52. The transmission controller 52 controls the positioning of the swash plates on the left and right variable displacement pumps 20 and 21 by selectively energizing left and right solenoids 54 and 55. In this way the controller 52 selectively controls the output to the ground engaging means 14 by controlling the mechanical output of the left and right hydraulic motors 22 and 23. In addition the controller 52 controls the energization of the solenoid 48.

The controller 52 receives operator inputs from an ignition switch 56, steering control elements 58 and a manual brake control element 60. The ignition switch 56 is the typical key-type ignition switch used on a variety of vehicles. The steering control elements 58 can be left and right pedals (schematically illustrated in FIGS. 2 and 3), or hand levers, or a steering wheel. The steering control elements 58 signals the desired direction the operator wishes the vehicle to go. The manual brake control element 60 can be a pedal or another type of operator input.

Figure 4:
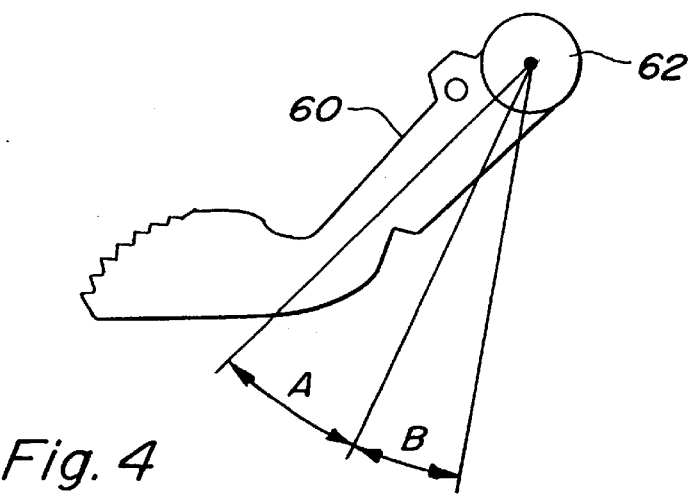
FIG. 4 is a side view of the brake pedal.

The manual brake control element 60 travels a distance that is divided into a first range and a second range. As illustrated in FIG. 4, the pedal 60 travels through a first arc segment A (the first range) then a second arc segment B (the second range). A potentiometer 62 or other suitable sensor signals the pedal position to the controller 52, so that the controller 52 is informed if the brake pedal has been depressed, if it is in the first range, or if it is in the second range. If the pedal 60 is detected in the first range, the controller 52 reduces the output of the hydrostatic pumps 20 and 21 decelerating the vehicle 10. In addition, the controller 52 of the potentiometer 62 itself can signal an engine controller or the engine directly to reduce engine output at the same time. As the pedal 60 moves into the second range, the output of the hydrostatic pumps 20 and 21 is shut down completely and the brake solenoid 48 is de-energized so that pressurized hydraulic fluid is no longer directed to the brakes 38 and 39 and the brakes 38 and 39 are hydraulically connected to the hydraulic reservoir 42. The springs reapply the brakes 38 and 39 braking the vehicle 10.

The vehicle 10 is also provided with a secondary hydraulic system 70. In the illustrated embodiment, the secondary hydraulic system 70 is a maintenance system used for lifting and tilting the operator's cab for maintenance. The secondary hydraulic system comprises a hand actuated hydraulic pump 72 that is used to drive cab lift hydraulic cylinder 74. The pump 72 receives hydraulic fluid from reservoir 42 through supply line 76 past check valve 78. The pump 72 pressurizes the hydraulic fluid and pumps it through supply line 80 past check valve 82 to a two-position selector valve 84. A pressure relief valve 86 maintains constant pressure in the secondary hydraulic system 70. From the selector valve 84 the fluid is transmitted and received though supply/return lines 87 and 88 to and from lift hydraulic cylinder 74. As such, the two-position selector valve 78 is hydraulically positioned between the pump 72 and the hydraulic cylinder 74. Hydraulic fluid is returned to the reservoir 42 through return line 90.

Figure 2:
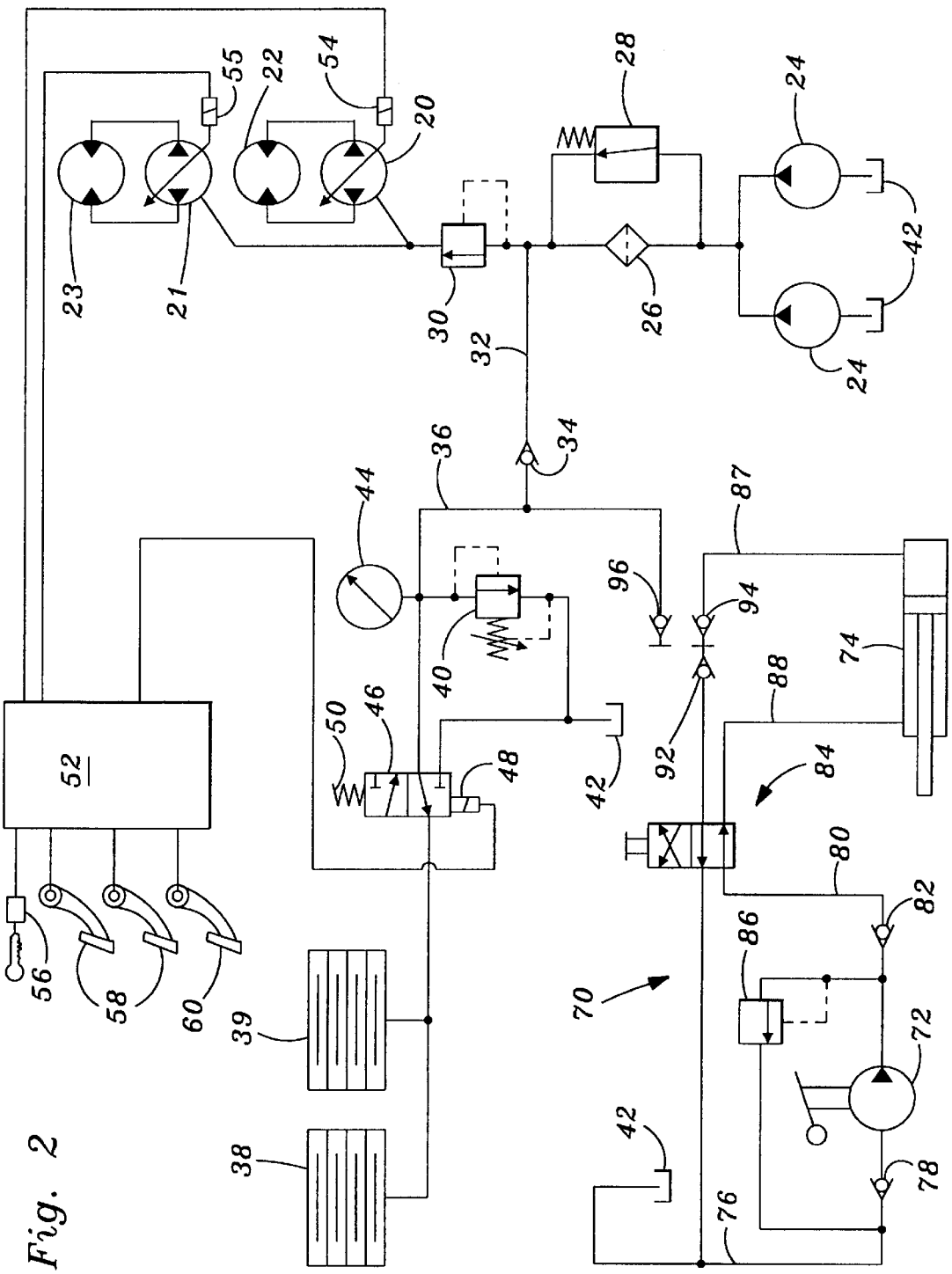
FIG. 2 is a hydraulic and electrical schematic of the braking system in normal operations.
Figure 3:
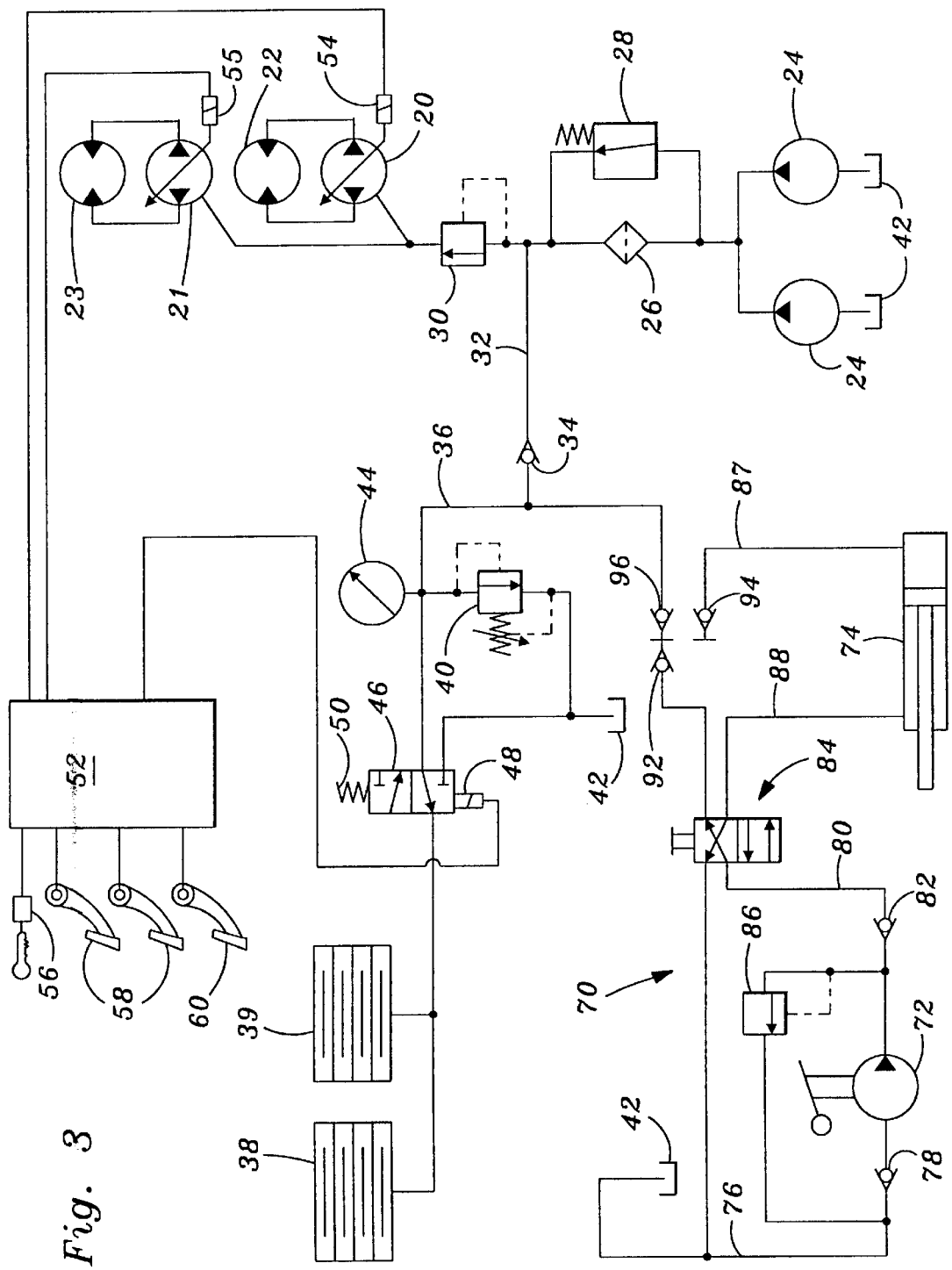
FIG. 3 is a hydraulic and electrical schematic of the braking system when the vehicle is being towed.

In normal operations, illustrated in FIG. 2, the selector valve 78 is in its first position and hydraulic fluid from the piston side of the hydraulic cylinder 74 is returned to the hydraulic reservoir 42 through supply/return line 87 and return line 90. The supply/return line 87 is provided with a first hydraulic quick coupler 92 and a second hydraulic quick coupler 94 that are coupled together and form a fluid flow path through supply/return line 87.

If the engine or transmission is disabled there may be no pressurized hydraulic fluid to release the brakes 38 and 39. It would be extremely difficult to tow the vehicle without disabling the brakes or providing an alternative source of pressurized fluid to the brakes 38 and 39. The present invention uses the secondary hydraulic system 70 to readily supply the pressurized hydraulic fluid to release the spring applied hydraulically released brakes 38 and 39. To this end branch hydraulic line 32 is provided with a third hydraulic quick coupler 96.

To tow the vehicle 10 both sides of the hydrostatic transmission need to be short circuited, so that the driver wheel or sprocket is allowed to free wheel. In addition, the selector valve 84 needs to be is shifted into its second position illustrated in FIG. 3, the first quick coupler 92 is decoupled from the second quick coupler 94, and the first quick coupler 92 is coupled to the third quick coupler 96. Furthermore, the ignition switch 56 must be turned on by the key to energize solenoid 48, shifting brake valve 46. The operator can then manually operate hand pump 72 directing pressurized hydraulic fluid through supply line 80 past selector valve 84, through the first and third quick couplers 92 and 96 to branch hydraulic line 36 where the pressurized hydraulic fluid is directed to the brakes 38 and 39.

Having described the preferred embodiment, it will become apparent that various modifications can be made without departing from the scope of the invention as defined in the accompanying claims.

What is claimed is:

1. A work vehicle comprising;

a frame;

ground engaging means for supporting and propelling the frame;

a source of pressurized hydraulic fluid;

spring applied hydraulically released brakes for braking the ground engaging means;

a brake system hydraulic line extends from the source of pressurized fluid to the spring applied hydraulically released brakes for directing pressurized hydraulic fluid from the source of pressurized hydraulic fluid to the spring applied hydraulically released brakes;

a manual control element operated by an operator for applying the spring applied hydraulically released brakes;

a secondary hydraulic system for performing a secondary operation independent of the spring applied hydraulically released brakes, the secondary hydraulic system having a manually operated hydraulic pump that provides pressurized hydraulic fluid to a hydraulic cylinder for a secondary vehicle operation through a secondary system hydraulic line;

wherein the secondary system hydraulic line is provided with a first hydraulic quick coupler and a second hydraulic quick coupler which are coupled together when the secondary system is being operated, the brake system hydraulic line is provided with a third hydraulic quick coupler that is coupled to the first hydraulic quick coupler when the work vehicle is being towed so that the manually operated hydraulic pump supplies pressurized hydraulic fluid to release the spring applied hydraulically released brakes.

2. A work vehicle as defined by claim 1 wherein the ground engaging means is driven by a hydrostatic transmission having a charge pump, the charge pump comprising the source of pressurized hydraulic fluid.

3. A work vehicle as defined by claim 2 wherein an electrically actuated brake valve is hydraulically positioned between the charge pump and the spring applied hydraulically released brakes for selectively directing pressurized hydraulic fluid from the charge pumps to the spring applied hydraulically released brakes, the electrically actuated brake valve having a first position that prevents the flow of pressurized hydraulic fluid to the spring applied hydraulically released brakes and a second position that allows the flow of pressurized hydraulic fluid to the spring applied hydraulically released brakes.

4. A work vehicle as defined by claim 3 wherein the secondary hydraulic system is provided with a two-position selector valve hydraulically positioned between the hydraulic cylinder and the manually operated hydraulic pump.

5. A work vehicle as defined by claim 4 wherein the secondary operation is a vehicle maintenance operation.

6. A work vehicle as defined by claim 5 further comprising an operator's station from which the work vehicle is controlled, the hydraulic cylinder of the secondary hydraulic system is used to tilt the operator's station.

7. A work vehicle as defined by claim 6 wherein the manual control element is a pedal.

8. A work vehicle as defined by claim 6 wherein the hydrostatic transmission comprises left and right variable displacement pumps having a hydraulic output, the hydraulic output of which is controlled by a controller in response to signals by an operator.

9. A work vehicle as defined by claim 8 wherein the controller controls the left and right variable displacement hydrostatic pumps and the electrically actuated brake valve.

10. A work vehicle as defined by claim 9 wherein the manual control element moves through a distance defined by a first range and a second range, the first and second ranges being sequential.

11. A work vehicle as defined by claim 10 wherein the controller reduces the output of the left and right variable displacement pumps as the control element moves through the first range and applies the spring applied hydraulically released brakes when the manual control element moves through the second range.

12. A work vehicle as defined by claim 11 wherein the manual control element is a pedal and the first range is an a first arc segment and the second range is a second arc segment.

13. A work vehicle as defined by claim 1 wherein an electrically actuated brake valve is hydraulically positioned between the source of pressurized hydraulic fluid and the spring applied hydraulically released brakes for selectively directing pressurized hydraulic fluid from the charge pumps to the spring applied hydraulically released brakes, the electrically actuated brake valve having a first position that prevents the flow of pressurized hydraulic fluid to the spring applied hydraulically released brakes and a second position that allows the flow of pressurized hydraulic fluid to the spring applied hydraulically released brakes.

14. A work vehicle as defined by claim 13 wherein the secondary hydraulic system is provided with a two-position selector valve hydraulically positioned between the hydraulic cylinder and the manually operated hydraulic pump.

15. A work vehicle as defined by claim 14 wherein the secondary operation is a vehicle maintenance operation.

16. A work vehicle as defined by claim 15 further comprising an operator's station from which the work vehicle is controlled, the hydraulic cylinder of the secondary hydraulic system is used to tilt the operator's station.

17. A work vehicle as defined by claim 16 wherein the manual control element is a pedal.

18. A work vehicle comprising;
a frame;
ground engaging means for supporting and propelling the frame;
a dual path hydrostatic transmission for driving the ground engaging means, the dual path hydrostatic transmission having left and right variable displacement pumps having an output;
a charge pump for the left and right variable displacement pumps;
spring applied hydraulically released brakes for braking the ground engaging means;
a controller for controlling the output of the left and right variable displacement pumps and the application of the spring applied hydraulically released brakes, a manual control element that is operated by an operator signals the controller when to apply the spring applied hydraulically released brakes;
a brake system hydraulic line extends from the charge pump to the spring applied hydraulically released brakes for directing pressurized hydraulic fluid from the charge pump to the spring applied hydraulically released brakes;
a secondary hydraulic system for performing a secondary operation independent of the spring applied hydraulically released brakes, the secondary hydraulic system having a manually operated hydraulic pump that provides pressurized hydraulic fluid to a hydraulic cylinder for a secondary vehicle operation through a secondary system hydraulic line;
wherein the secondary system hydraulic line is provided with a first hydraulic quick coupler and a second hydraulic quick coupler which are coupled together when the secondary system is being operated, the brake system hydraulic line is provided with a third hydraulic quick coupler that is coupled to the first hydraulic quick coupler when the work vehicle is being towed so that the manually operated hydraulic pump supplies pressurized hydraulic fluid to the spring applied hydraulically released brakes to release the spring applied hydraulically released brakes.

19. A work vehicle as defined by claim 18 wherein an electrically actuated brake valve is hydraulically positioned between the charge pump and the spring applied hydraulically released brakes for selectively directing pressurized hydraulic fluid from the charge pumps to the spring applied hydraulically released brakes, the electrically actuated brake valve having a first position that prevents the flow of pressurized hydraulic fluid to the spring applied hydraulically released brakes and a second position that allows the flow of pressurized hydraulic fluid to the spring applied hydraulically released brakes, the electrically actuated brake valve being in electrical communication with the controller.

20. A work vehicle as defined by claim 19 wherein the manual control element is a pedal that moves through a first arc segment and a second arc segment in a sequential manner, as the pedal moves through the first arc segment the controller reduces the output of the left and right variable displacement hydraulic pumps, as the pedal moves through the second arc segment the controller applies the spring applied hydraulically released brakes.

* * * * *